United States Patent
Riefler

(10) Patent No.: US 11,198,629 B2
(45) Date of Patent: Dec. 14, 2021

(54) METHOD FOR ACTIVELY TREATING MINING WASTEWATER FOR PIGMENT PRODUCTION

(71) Applicant: OHIO UNIVERSITY, Athens, OH (US)

(72) Inventor: R. Guy Riefler, Athens, OH (US)

(73) Assignee: OHIO UNIVERSITY, Athens, OH (US)

( * ) Notice: Subject to any disclaimer, the term of this patent is extended or adjusted under 35 U.S.C. 154(b) by 824 days.

(21) Appl. No.: 15/816,542

(22) Filed: Nov. 17, 2017

(65) Prior Publication Data

US 2018/0134597 A1 May 17, 2018

Related U.S. Application Data

(60) Provisional application No. 62/423,229, filed on Nov. 17, 2016.

(51) Int. Cl.
C02F 3/34 (2006.01)
C09C 1/24 (2006.01)
(Continued)

(52) U.S. Cl.
CPC .............. *C02F 3/346* (2013.01); *C09C 1/24* (2013.01); *C09D 7/61* (2018.01); *C02F 1/66* (2013.01);
(Continued)

(58) Field of Classification Search
CPC ............ C02F 2101/203; C02F 2103/10; C02F 3/346; C08K 2003/2265; C09C 1/24
See application file for complete search history.

(56) References Cited

U.S. PATENT DOCUMENTS 2,829,964 A * 4/1958 Zimmerley ............... C22B 3/18
  210/620
3,607,721 A * 9/1971 Nagy .................... C10G 1/045
  208/390
(Continued)

FOREIGN PATENT DOCUMENTS

JP    2004202488 A  *  7/2004
KR    100439535 B1  *  7/2004
(Continued)

OTHER PUBLICATIONS

Bruneel et al., Diveristy of microorganisms in Fe—As-Rich Acid mine Drainage Waters of Carnoules, France, Jan. 2006, Applied and Environmental Microbiology, pp. 551-556 (Year: 2006).*
(Continued)

*Primary Examiner* — Hayden Brewster
(74) *Attorney, Agent, or Firm* — Standley Law Group LLP

(57) ABSTRACT

Systems and methods for actively treating mining wastewater, such as acid mine drainage, using a mixed culture of iron oxidizing bacteria, in a manner that results in both remediation of the water and the production of a useful end product. Exemplary systems and methods employ a reaction vessel where the bacteria can oxidize the iron in the mining wastewater for some amount of time, and a settling tank into which reacted water may be transferred and retained to permit iron oxyhydroxide contained in the water to settle as iron oxyhydroxide sludge. The iron oxyhydroxide sludge may be dried to produce iron oxyhydroxide solids that can be employed in the manufacture of a usable pigment.

14 Claims, 6 Drawing Sheets

(51) Int. Cl.
  *C02F 1/66* (2006.01)
  *C02F 11/12* (2019.01)
  *C09D 7/61* (2018.01)
  *C02F 103/10* (2006.01)
  *C02F 101/20* (2006.01)
  *C08K 3/22* (2006.01)
  *C02F 1/00* (2006.01)

(52) U.S. Cl.
  CPC ......... *C02F 11/12* (2013.01); *C02F 2001/007* (2013.01); *C02F 2101/203* (2013.01); *C02F 2103/10* (2013.01); *C08K 2003/2265* (2013.01)

(56) References Cited

U.S. PATENT DOCUMENTS

| | | | | |
|---|---|---|---|---|
| 3,617,559 | A * | 11/1971 | Cywin | C02F 9/00 |
| | | | | 210/713 |
| 4,758,415 | A * | 7/1988 | Patil | C01G 49/06 |
| | | | | 106/456 |
| 5,954,969 | A | 9/1999 | Hedin | |
| 6,485,696 | B1 * | 11/2002 | Sato | C22B 7/006 |
| | | | | 423/127 |
| 2012/0237995 | A1 * | 9/2012 | Kuwano | C12P 3/00 |
| | | | | 435/168 |
| 2012/0296147 | A1 * | 11/2012 | Swearingen | C02F 9/00 |
| | | | | 588/318 |

FOREIGN PATENT DOCUMENTS

| | | | | |
|---|---|---|---|---|
| KR | 100842304 | B1 * | 6/2008 | |
| KR | 101370246 | | * 3/2014 | |
| UZ | WO 2004/033732 | A1 * | 4/2004 | ............... C22B 3/18 |
| WO | 2004033732 | A1 | 4/2004 | |
| WO | WO-2016006118 | A1 * | 1/2016 | ................ C02F 3/28 |

OTHER PUBLICATIONS

JP2004202488 Ono et al.—Method for treating metal mine drainage (Abstract & MT; Jul. 22, 2004). (Year: 2004).*
KR100842304—Sung et al.—Purificating the outflow water of Abandoned Mine Water (Abstract & MT; Jun. 30, 2008). (Year: 2008).*
WO2016006118 Hamai et al.—Mine water purification method, system and agent (Abstracts & MT; Jan. 14, 2016). (Year: 2016).*
KR100439535 Choi et al.—Mine Drainage Disposal System and M of Treating (Abstracts & MT; Nov. 1, 2003). (Year: 2003).*
Doksa (MS Thesis—Synthesis of Iron Oxide Pigment from the Treatment of Truetown Acid Mine Drainage Utilizing Aeration (May 2015)). (Year: 2015).*
Johnson et al. (Acid mine drainage remediation options: a review, Science of the Total Environment, 338, 2005, pp. 3-14). (Year: 2005).*
Kirby, C.S. et al., Comparison of color, chemical and mineralogical compositions of mine drainage sediments to pigment, Environmental Geology 37, Mar. 1999, pp. 243-254.
Hedin, R., Recovery of Marketable Iron Oxide From Mine Drainage in the USA, Land Contamination & Reclamation, vol. 11, No. 2, 2003, pp. 93-97.
Steam Restoration Incorporated, www.cleancreek.org, site visited May 1, 2018.
Hedin Environmental, http://www.hedinenv.com/ironoxide.html, site visited May 1, 2018.
Iron Oxide Recovery, Inc. http://www.environoxide.com/, site visited May 1, 2018.
Ty-Mawr Lime Ltd, https://www.lime.org.uk/falu-rodfarg.html, site visited May 1, 2018.

* cited by examiner

| Flask | Rxn Rate (1/day) pH=3, T=12 | R2 | Rxn Rate (1/day) pH=3, T=20 | R2 | Rxn Rate (1/day) pH=4, T=12 | R2 | Rxn Rate (1/day) pH=4, T=20 | R2 |
|---|---|---|---|---|---|---|---|---|
| Control | -0.0004 | -0.021 | -0.011 | -0.209 | -0.003 | 0.006 | -0.002 | -0.0003 |
| Batgate | -0.008 | 0.2122 | 0.0042 | 0.114 | -0.007 | 0.1407 | -0.018 | 0.3462 |
| Batgate | -0.008 | 0.235 | 0.0007 | -0.042 | -0.008 | 0.1595 | -0.009 | 0.2055 |
| Batgate | -0.017 | 0.4152 | -0.001 | -0.003 | -0.023 | 0.3246 | -0.038 | 0.3798 |
| Carbondale Trib | -0.006 | 0.112 | -0.016 | 0.2151 | -0.36 | 0.843 | -0.131 | 0.8971 |
| Carbondale Trib | -0.013 | 0.1847 | -0.36 | 0.6633 | -0.008 | 0.026 | -0.078 | 0.521 |
| Carbondale Trib | -0.054 | 0.2746 | -0.346 | 0.6367 | 0.0102 | 0.0027 | -0.031 | 0.4713 |
| Carbondale | -0.117 | 0.3728 | -0.567 | 0.9354 | -0.54 | 0.8843 | -0.357 | 0.9329 |
| Carbondale | -0.186 | 0.5518 | -0.518 | 0.9361 | -0.026 | 0.1938 | -0.049 | 0.6583 |
| Carbondale | -0.04 | 0.4033 | -0.607 | 0.9141 | -0.02 | 0.2533 | -0.039 | 0.6785 |

*FIG. 2A*

| Flask | Rxn Rate (1/hr) pH=3, T=12 | pH=3, T=20 | pH=4, T=12 | pH=4, T=20 | Average Rxn Rate (1/hr) pH=3, T=12 | pH=3, T=20 | pH=4, T=12 | pH=4, T=20 |
|---|---|---|---|---|---|---|---|---|
| Control | -0.00002 | -0.00046 | -0.00013 | -0.00008 | -0.00002 | -0.00046 | -0.00013 | -0.00008 |
| Batgate | -0.00033 | 0.00018 | -0.00029 | -0.00117 | | | | |
| Batgate | -0.00033 | 0.00003 | -0.00033 | -0.00038 | -0.00046 | 0.00009 | -0.00053 | -0.00104 |
| Batgate | -0.00071 | -0.00004 | -0.00096 | -0.00158 | | | | |
| Carbondale Trib | -0.00025 | -0.00067 | -0.01500 | -0.00546 | | | | |
| Carbondale Trib | -0.00054 | -0.01500 | -0.00033 | -0.00137 | -0.00115 | -0.01003 | -0.00497 | -0.00264 |
| Carbondale Trib | -0.00267 | -0.01442 | 0.00043 | -0.00129 | | | | |
| Carbondale | -0.00488 | -0.02383 | -0.02250 | -0.00071 | | | | |
| Carbondale | -0.00775 | -0.02150 | -0.00108 | -0.00204 | -0.00476 | -0.02347 | -0.00814 | -0.00478 |
| Carbondale | -0.00167 | -0.02529 | -0.00083 | -0.00163 | | | | |

*FIG. 2B*

| Site | pH=5, T=13°C Rxn Rate (1/d) | R2 | pH=6, T=13°C Rxn Rate (1/d) | R2 | pH=5, T=21°C Rxn Rate (1/d) | R2 | pH=6, T=21°C Rxn Rate (1/d) | R2 |
|---|---|---|---|---|---|---|---|---|
| Control | -0.019 | 0.5048 | -0.042 | 0.2221 | 0.0593 | 0.488 | 0.0434 | 0.6469 |
| Batgate | -0.8 | 0.871 | -0.819 | 0.8324 | -1.146 | 0.8792 | -2.055 | 0.8784 |
| Batgate | -0.781 | 0.7184 | -0.728 | 0.6997 | -1.131 | 0.8976 | -1.673 | 0.8743 |
| Batgate | -0.843 | 0.7964 | -0.804 | 0.79 | -1.151 | 0.862 | -1.89 | 0.8797 |
| Carbondale | -1.28 | 0.696 | -1.253 | 0.7855 | -1.285 | 0.3912 | -2.232 | 0.8925 |
| Carbondale | -1.17 | 0.79 | -1.116 | 0.8424 | -1.533 | 0.4997 | -2.078 | 0.82 |
| Carbondale | -1.218 | 0.8157 | -1.357 | 0.807 | -2.203 | 0.791 | -2.108 | 0.7181 |
| Carbondale Trib | -1.201 | 0.9003 | -1.367 | 0.8049 | -2.444 | 0.81 | -2.381 | 0.8533 |
| Carbondale Trib | -1.444 | 0.6056 | -1.423 | 0.7147 | -1.315 | 0.257 | -2.185 | 0.9999 |
| Carbondale Trib | -1.258 | 0.7965 | -1.371 | 0.7563 | -1.228 | 0.2535 | -2.272 | 0.7871 |

*FIG. 2C*

| Site | Reaction Rates, hr-1 | | | | Average Reaction Rates, hr-1 | | | |
|---|---|---|---|---|---|---|---|---|
| | pH=5, T=13°C | pH=6, T=13°C | pH=5, T=21°C | pH=6, T=21°C | pH=5, T=13°C | pH=6, T=13°C | pH=5, T=21°C | pH=6, T=21°C |
| Control | -0.0008 | -0.0018 | 0.0025 | 0.0018 | -0.0008 | -0.0018 | 0.0025 | 0.0018 |
| Batgate | -0.0333 | -0.0341 | -0.0478 | -0.0856 | | | | |
| Batgate | -0.0325 | -0.0303 | -0.0471 | -0.0697 | -0.0337 | -0.0327 | -0.0476 | -0.0780 |
| Batgate | -0.0351 | -0.0335 | -0.0480 | -0.0788 | | | | |
| Carbondale | -0.0533 | -0.0522 | -0.0540 | -0.0930 | | | | |
| Carbondale | -0.0488 | -0.0465 | -0.0639 | -0.0866 | -0.0509 | -0.0518 | -0.0699 | -0.0314 |
| Carbondale | -0.0508 | -0.0565 | -0.0918 | -0.0878 | | | | |
| Carbondale Trib | -0.0500 | -0.0570 | -0.1018 | -0.0993 | | | | |
| Carbondale Trib | -0.0602 | -0.0593 | -0.0548 | -0.0910 | -0.0542 | -0.0578 | -0.0693 | -0.0950 |
| Carbondale Trib | -0.0524 | -0.0571 | -0.0512 | -0.0947 | | | | |

*FIG. 2D*

METHOD FOR ACTIVELY TREATING MINING WASTEWATER FOR PIGMENT PRODUCTION

CROSS-REFERENCE TO RELATED APPLICATIONS

This application claims the benefit of U.S. Provisional Application No. 62/423,229, filed on Nov. 17, 2016, which is hereby incorporated by reference as if fully recited herein.

FEDERALLY SPONSORED RESEARCH OR DEVELOPMENT

This invention was made with government support under 11-PA-11091400-015 awarded by United States Forest Service. The government has certain rights in the invention.

TECHNICAL FIELD

Exemplary system and method embodiments described herein are directed to the active treatment of mining wastewater in a manner that results in a useful pigment as a process derivative.

BACKGROUND

Mining wastewater, such as acid mine drainage, is a well-known byproduct of underground coal mining in certain regions, and is caused by the discharge of water from flooded underground coal mines. The exact chemistry of these discharges may vary by region. For example, underground coal mines in certain regions (including southeast Ohio) may discharge water that is polluted with both acid and iron.

Mining wastewater, such as acid mine drainage, is considered a pollutant. Consequently, the operators of active coal mines must pay to treat this discharged water—which may continue to be released for potentially hundreds of years. In the case of active coal mining operations, acid mine drainage is typically treated using a combination of large ponds, aerations systems, and acid neutralization by alkali addition. Because of the large land area available at mining operations, these large ponds are relatively inexpensive, although aeration and alkali costs can be significant.

More problematically, coal mines abandoned before 1977 are unregulated and may produce long term pollution of streams and other water bodies in violation of the Clean Water Act, because treatment is too costly for responsible state agencies. For example, seepage from at least half-a-dozen abandoned coal mines in southeast Ohio continues to contaminate waterways. At least partial neutralization of the acid in this polluted water may be accomplished via alkali addition, but at great cost, and no removal of the metals entrained in the discharged water is undertaken. In Pennsylvania, budgets have allowed for the construction and operation of several water treatment plants to remove metals and neutralize the acidity of acid mine drainage water, but again at a significant cost.

It should be apparent that a reduction in the cost of treating mining wastewater is desirable. To that end, it has been realized that there may be value in deriving pigments from or using the sludge produced by at least certain mining wastewater and, over the years, a few companies have marketed such associated products. For example, wastewater from a copper mine has been used since the 16th century in Sweden to produce a deep red paint. There is now also an available line of pottery and glassware made using sludge recovered from passively-treated mining wastewater, as well as a line of paints using pigment recovered by passively treating mining wastewater.

The existence of the aforementioned products demonstrates the potential value of properly treated and processed mining wastewater. However, this previous work relies entirely on excavating and refining mining wastewater sludge that has oxidized and settled naturally in large deposits over many years, or on the slow passive treatment of mining wastewater.

It can be understood from the foregoing description that what is needed, but has been heretofore unavailable, is an active system and method for treating mining wastewater in a manner that more quickly results in a useful end product. Exemplary system and method embodiments described herein fulfill this need.

SUMMARY

Exemplary system and method embodiments of the general inventive concept may be used to treat mining wastewater associated with both abandoned coal mines and active coal mining operations. More particularly, exemplary system and method embodiments described herein are useful in treating mining wastewater that includes a sufficiently high iron content, and may also include acid.

Generally speaking, exemplary active treatment methods operate to remove the iron and neutralize any acid present in mining wastewater, so the water can be subsequently released to streams and/or other waterways without any harmful effects. Furthermore, remediation of mining wastewater according to exemplary active treatment methods results in pure iron oxyhydroxide as a byproduct. The resulting iron oxyhydroxide has value in the pigment market and, therefore, may be sold to offset the costs of remediation.

In one exemplary mining wastewater remediation process, wastewater is directed from a mine seep into a mixed reactor that has been inoculated with a mixed culture of iron oxidizing bacteria. The bacteria is then allowed to oxidize the iron present in the wastewater within the reactor for some period of time. Reaction times may vary based on the temperature and the concentration of iron in the wastewater. The pH value within the reactor is maintained within a predetermined range during this time.

Upon conclusion of the reaction phase of the treatment process, the water is discharged from the reactor into a settling tank for some period of time, which may also vary. During the settling phase, iron oxyhydroxide within the water settles as a sludge. Upon conclusion of the settling phase, clear water that exits within the settling tank may be drained and neutralized by a variety of methods that would be familiar to one of skill in the art prior to reintroduction to the environment (e.g., a stream). The iron oxyhydroxide sludge may be removed, dewatered and dried to produce iron oxyhydroxide solids that are suitable for use as a pigment.

Other aspects and features of the inventive concept will become apparent to those of skill in the art upon review of the following detailed description of exemplary embodiments along with the accompanying drawing figures.

BRIEF DESCRIPTION OF THE DRAWINGS

In the following descriptions of the drawings and exemplary embodiments, like reference numerals across the several views refer to identical or equivalent features, and:

FIGS. 2A-2D show tables of various operating conditions, bacterial cultures, and reaction rates associated with an exemplary system and method of treating mining wastewater;

DETAILED DESCRIPTION OF THE EXEMPLARY EMBODIMENTS

As described above, exemplary system and method embodiments of the general inventive concept may be used to treat mining wastewater associated with both abandoned and active coal mines. It is believed that this is the first developed process to treat highly contaminated, high volume acid mine drainage, using iron oxidizing bacteria in an active, rapid process, with a small footprint, while simultaneously producing a saleable pigment.

Generally speaking, exemplary active treatment methods operate to remove the iron and neutralize any acid present in mining wastewater, so the water can be subsequently released to streams and/or other waterways without any harmful effects. For example, exemplary treatment methods have been shown to be effective in treating acid mine drainage water whose total dissolved metals content is greater than 70% iron.

Figure 1:
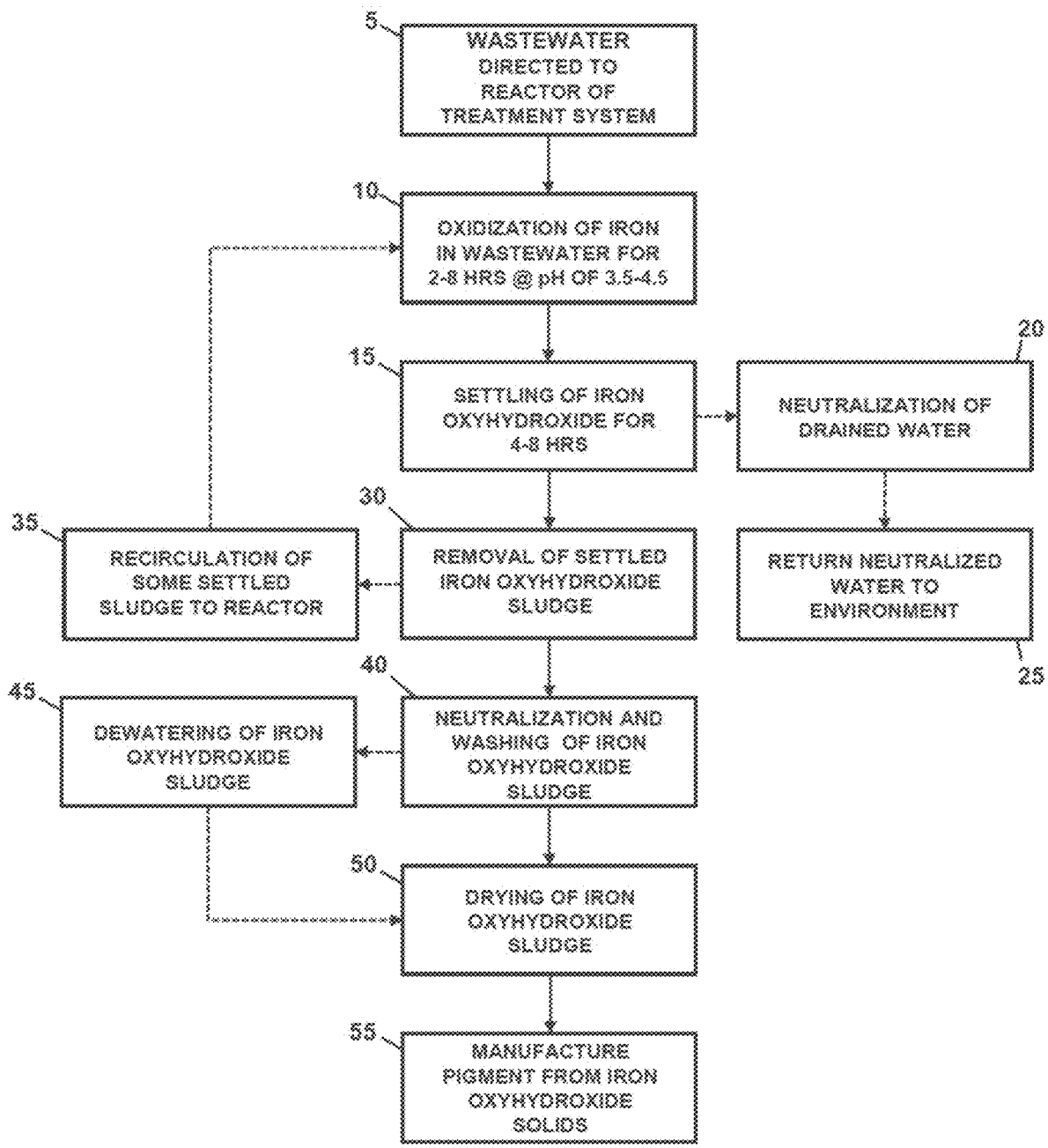
FIG. 1 is a block process diagram indicating the general steps of one exemplary method of treating mining wastewater.

FIG. 1 depicts the steps of one exemplary method for actively treating mining wastewater to produce a saleable pigment. In this process, wastewater in the form of acid mine drainage is initially directed from a wastewater source (e.g., a mine seep) into a mixed reactor (e.g., a reaction vessel) of an exemplary treatment system 5 that has been inoculated with a (e.g., locally collected) mixed culture of iron oxidizing bacteria. The bacteria is then allowed to oxidize the iron present in the wastewater within the reactor for some period of time 10. Reaction times may vary based on the temperature and the concentration of iron in the wastewater, but are generally between 2-8 hours. During reaction of the water and bacteria in the reactor, the pH value within the reactor is preferably maintained within a range of 3.5-4.5.

Upon conclusion of the reaction phase of the treatment process, the water is discharged from the reactor into a settling tank or similar device and the iron oxyhydroxide present within the water is allowed to settle 15 for a period of time that is generally between 4-8 hours. During the settling phase, the iron oxyhydroxide within the water settles to the bottom of the settling tank as sludge.

Upon conclusion of the settling phase, clear water is drained from the settling tank and may be neutralized 20 to a pH level of, for example, about 7.5. Neutralization may be accomplished by a variety of methods, including but not limited to the addition of lime and/or the use of steel slag leach beds. The neutralized, metal free water may be subsequently returned to the environment 25.

The iron oxyhydroxide sludge that settles to the bottom of the settling tank has been found to be generally about 1% solids. The sludge may be removed 30 from the settling tank, and a portion thereof may optionally be recirculated 35 to the reaction vessel to maintain the biological culture and increase reaction rates. The remaining portion of the removed sludge may be neutralized (e.g., to a pH of about 7.5), and washed 40. The neutralized sludge may then be (optionally) dewatered 45, and dried 50 by any suitable technique known in the art, to produce iron oxyhydroxide solids. The oxyhydroxide solids may then be employed in the manufacture of a usable pigment 55.

Exemplary mining wastewater treatment processes have been performed many times on a laboratory scale. Optimal processing conditions (e.g., pH, temperature, and different bacterial cultures) have been determined in these lab-scale studies. Various ones of these processing conditions are indicated in the tables of FIGS. 2A-2D.

Pigments have been manufactured using iron oxyhydroxide solids obtained from laboratory-scale mining wastewater treatment as described herein, such as via the treatment process represented in the diagram of FIG. 1. These pigments have been subjected to various testing to determine the effects of different processing conditions thereon. Pigments manufactured using iron oxyhydroxide solids obtained from mining wastewater treatment as described herein have also been subjected to various testing to determine their suitability for use in paints and other products. For example, pigments have been tested for quality by industry standards such as iron oxide content, mineral structure by x-ray diffraction, and hiding power by drawdowns.

Figure 3:
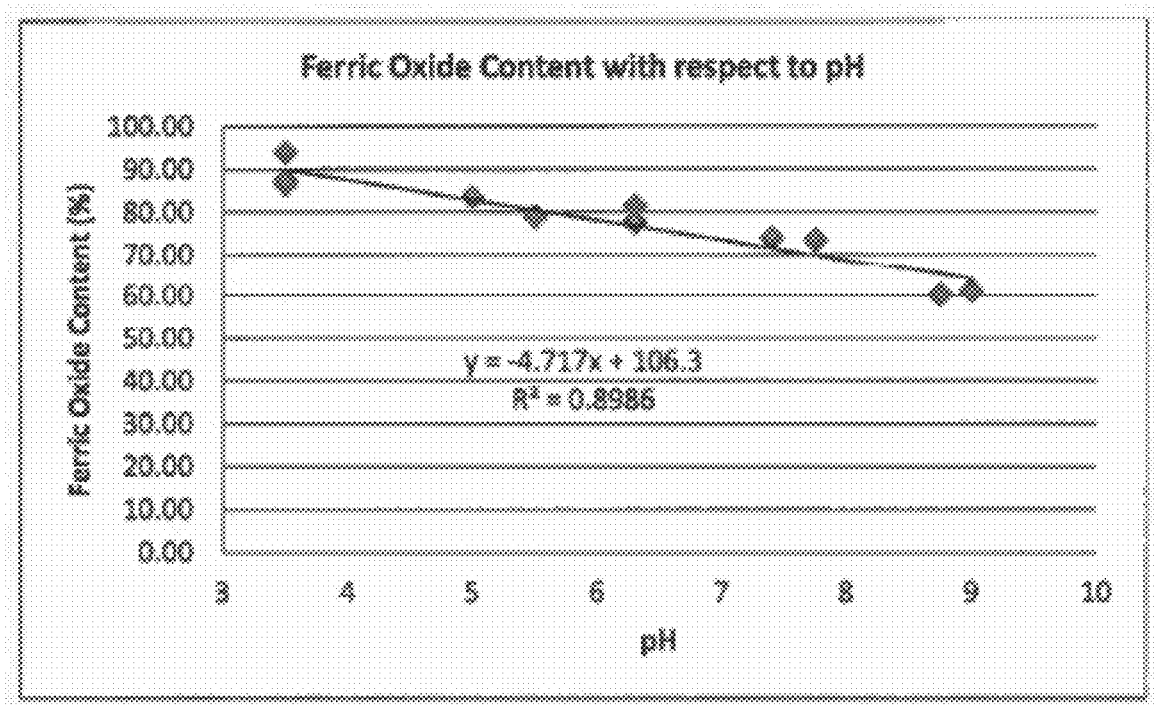
FIG. 3 is a graph showing the ferric oxide content vs. pH of a pigment synthesized using an exemplary system and method of treating mining wastewater.

The results of one exemplary ferric (iron) oxide content test on an exemplary pigment sample are graphically presented in FIG. 3. As shown, the results of the iron oxide content test are presented as a comparison of the iron oxide content of the pigment to the pH level at which the pigment was synthesized. Notably, the iron oxide content of the pigment drops as the pH level at synthesis increases.

Figure 4A:
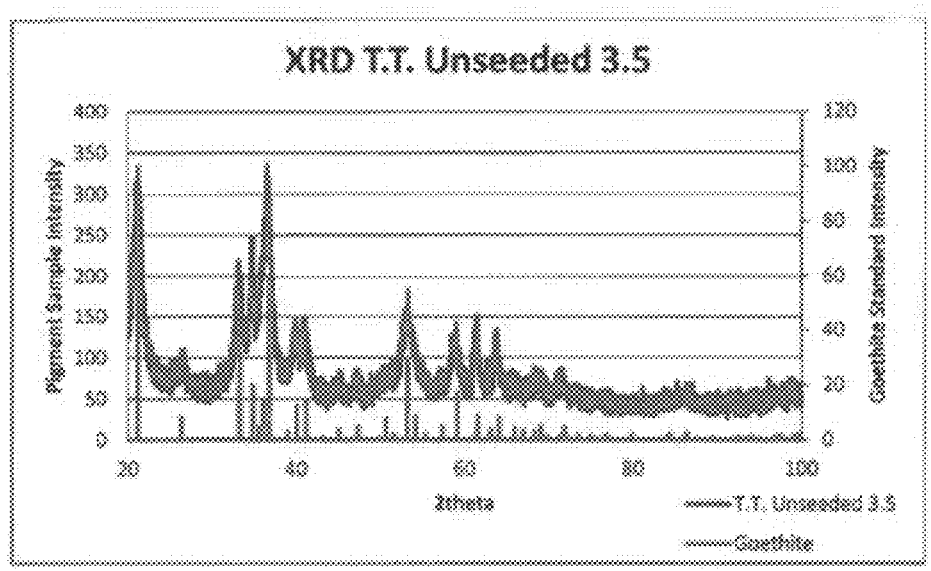
FIGS. 4A-4B are powdered x-ray diffraction graphs showing the match between pure pigment goethite and iron oxyhydroxides synthesized using an exemplary system and method of treating mining wastewater.
Figure 4B:
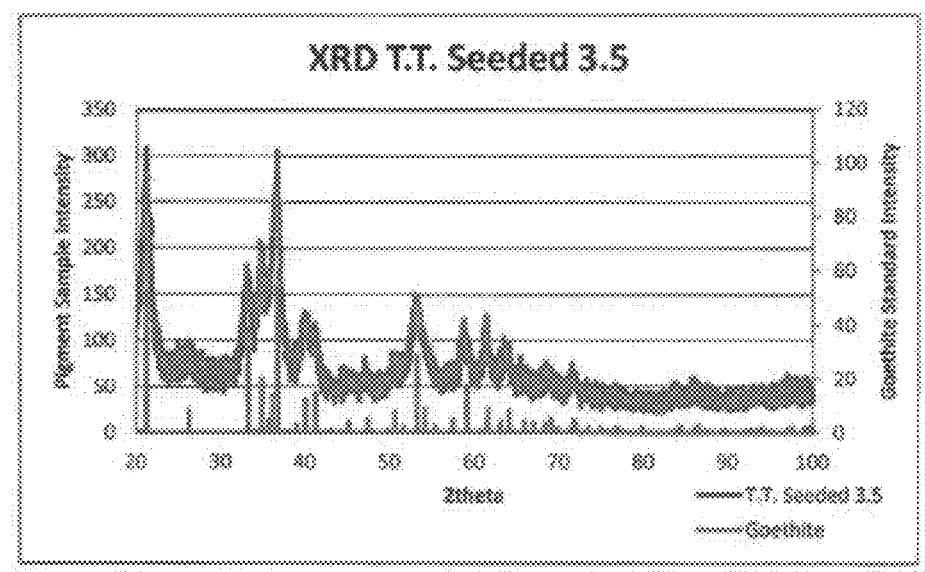

The results of one exemplary x-ray diffraction (XRD) test on exemplary seeded and unseeded pigment samples are respectively presented graphically in FIGS. 4A-4B. As shown, the results of the XRD tests are presented as a comparison of the diffraction intensity of the tested pigments to the goethite standard intensity.

Figure 5:
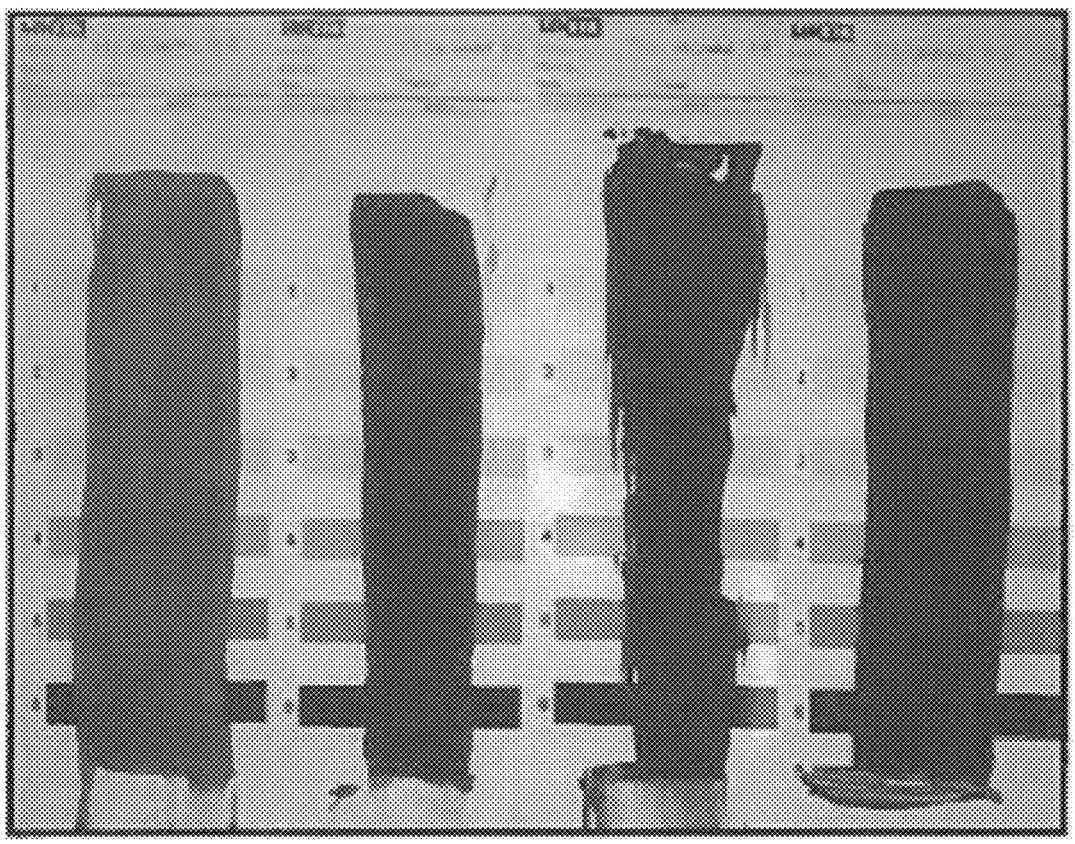
FIG. 5 shows drawdowns of several paints produced from pigments synthesized using an exemplary system and method of treating mining wastewater.

The results of yet another pigment test are presented in FIG. 5. More particularly, FIG. 5 shows four separate drawdowns of paints made from pigments characterized as, from left-to-right respectively, unseeded 3.5, unseeded 5.0, unseeded 5.5 and unseeded 6.3—where the numeral associated with each designation represents the pH level at which the pigment was synthesized. All show excellent hiding power and the best color when produced at the lowest pH.

The use of exemplary mining wastewater treatment systems and methods allows for both the remediation of the wastewater and the production of useable iron oxyhydroxide. It is believed that income from the sale of pigments manufactured using said iron hydroxide could exceed the overall operation and treatment costs of an exemplary system. Such a reduction in overall remediation costs is a benefit to active mining operations and may enable the cleanup of waters that have been polluted for decades and continue to be polluted without any mitigation.

While certain exemplary embodiments are described in detail above, the scope of the general inventive concept is not considered limited by such disclosure, and modifications are possible without departing from the spirit thereof as evidenced by the following claims:

What is claimed is:

1. A method for producing pigment by actively treating iron oxyhydroxide-containing mining wastewater, comprising:
providing a series of vessels for treating the iron oxyhydroxide containing mining wastewater, the series of vessels including a reaction vessel as a first vessel and a settling tank as a second vessel;
inoculating the reaction vessel with a mixed culture of iron oxidizing bacteria;
directing the iron oxyhydroxide-containing mining wastewater into the reaction vessel and allowing the iron oxidizing bacteria to oxidize the iron in the iron oxyhydroxide-containing mining wastewater for an amount of time between about 2-8 hours while maintaining the pH level in the reaction vessel between about 3.5-4.5;
discharging the iron oxyhydroxide-containing mining wastewater from the reaction vessel into the settling tank, and retaining the iron oxyhydroxide-containing mining wastewater in the settling tank while the iron oxyhydroxide in the mining wastewater settles as an iron oxyhydroxide sludge;
draining the resulting water from the settling tank;
removing the settled iron oxyhydroxide sludge from the settling tank;
neutralizing the removed iron oxyhydroxide sludge;
drying the neutralized iron oxhydroxide sludge to produce iron oxyhydroxide solids; and
manufacturing a pigment from the iron oxyhydroxide solids.

2. The method of claim 1, wherein the mining wastewater is retained in the settling tank for between about 4-8 hours.

3. The method of claim 1, further comprising neutralizing the mining wastewater drained from the settling tank.

4. The method of claim 3, wherein the mining wastewater is neutralized to a pH level of about 7.5.

5. The method of claim 3, further comprising returning the neutralized mining wastewater to the environment.

6. The method of claim 1, further comprising returning a portion of the iron oxyhydroxide sludge removed from the settling tank to the reaction vessel, before the sludge is neutralized.

7. The method of claim 1, wherein the total dissolved metals content in the mining wastewater is greater than 70 weight % iron.

8. The method of claim 1, wherein the iron oxidizing bacteria are sourced from the same relative locale as the mining wastewater.

9. The method of claim 1, wherein the iron oxidizing bacteria are provided as a mixed culture sourced from a number of mine drainage sites.

10. The method of claim 1, further comprising using the pigment in the manufacture of paint.

11. A method for producing pigment by actively treating iron oxyhydroxide-containing acid mine water, comprising:
providing a series of vessels for treating the acid mine water, the series of vessels including a reaction vessel as a first vessel and a settling tank as a second vessel;
inoculating the reaction vessel with a mixed culture of iron oxidizing bacteria;
directing the iron oxyhydroxide-containing acid mine water into the reaction vessel and allowing the iron oxidizing bacteria to oxidize the iron in the iron oxyhydroxide-containing acid mine water for an amount of time between about 2-8 hours at a temperature of between 12° C.-21° C. while maintaining the pH level in the reaction vessel between about 3.5-4.5;
discharging the acid mine water from the reaction vessel into the settling tank, and retaining the iron oxyhydroxide-containing acid mine water in the settling tank for some amount of time sufficient to permit the iron oxyhydroxide in the acid mine water to settle in the settling tank as iron oxyhydroxide sludge;
draining the resulting water from the settling tank;
optionally, neutralizing the water drained from the settling tank;
optionally, returning the neutralized water to the environment;
removing the settled iron oxyhydroxide sludge from the settling tank;
optionally, returning a portion of the iron oxyhydroxide sludge to the reaction vessel;
neutralizing the iron oxyhydroxide sludge not returned to the reaction vessel;
dewatering and drying the neutralized iron oxyhydroxide sludge to produce iron oxyhydroxide solids; and
manufacturing a pigment from the iron oxyhydroxide solids.

12. The method of claim 11, wherein the acid mine water is retained in the settling tank for between about 4-8 hours.

13. The method of claim 11, wherein the total dissolved metals content in the acid mine water is greater than 70 weight % iron.

14. The method of claim 11, wherein the source of the iron oxidizing bacteria is selected from the group consisting of the same relative locale as the acid mine water and the combination of a number of different acid mine drainage sites.

* * * * *